(12) United States Patent
Lee

(10) Patent No.: US 6,190,080 B1
(45) Date of Patent: Feb. 20, 2001

(54) BALL JOINT DEVICE FOR USE IN A VEHICLE

(75) Inventor: Hee-Bang Lee, Kyungnam (KR)

(73) Assignee: Central Corporation, Kyung Nam (KR)

( * ) Notice: Under 35 U.S.C. 154(b), the term of this patent shall be extended for 0 days.

(21) Appl. No.: 09/292,597

(22) Filed: Apr. 16, 1999

(30) Foreign Application Priority Data

Apr. 16, 1998 (KR) .................................................. 98-14278

(51) Int. Cl.[7] .................................................. F16C 7/00
(52) U.S. Cl. .................................................. 403/135; 403/140
(58) Field of Search .................................................. 403/135, 133, 403/132, 140, 141, 122, 131

(56) References Cited

U.S. PATENT DOCUMENTS

| 4,690,581 | * | 9/1987 | Umemoto et al. | 403/133 |
|---|---|---|---|---|
| 5,011,321 | | 4/1991 | Kidokoro . | |
| 5,611,635 | * | 3/1997 | Schutt et al. | 403/141 |
| 5,676,485 | * | 10/1997 | Lee | 403/135 |
| 5,704,727 | * | 1/1998 | Atkins et al. | 403/135 |
| 5,876,149 | * | 3/1999 | Dorr et al. | 403/134 |

FOREIGN PATENT DOCUMENTS

| 1-172610 | 7/1989 | (JP) . |
|---|---|---|
| Y25-23852 | 6/1993 | (JP) . |

\* cited by examiner

*Primary Examiner*—Harry C. Kim
(74) *Attorney, Agent, or Firm*—Birch, Stewart, Kolasch & Birch, LLP

(57) ABSTRACT

A ball joint having a cylindrical housing containing a plurality of projections. A cylindrical ball seat is inserted within the housing and secured to the housing by the plurality of projections. A ball stud having a spherical head portion is rotatably disposed within the ball seat, and a cap is disposed at and secured to the lower, outside portion of the ball seat.

4 Claims, 4 Drawing Sheets

BALL JOINT DEVICE FOR USE IN A VEHICLE

BACKGROUND OF THE INVENTION

1. Field of the Invention

The present invention relates to a ball joint device for use in a joint of steering or suspension systems of automobiles, and more particularly to a ball joint of automobiles which removes the damage caused by twist occurring in the assembly process.

2. Description of Related Art

Various types of ball joints for use in a vehicle are well known in the art. A ball joint rotatably and tiltable on any plane surface is generally used for a steering or a suspension system of automobiles. A conventional ball joint has a structure in which a spherical head of a ball stud is inserted into the inside of a ball seat under the condition that its rotational and tilt operation is enabled; the ball seat is fixed to a housing and a dust cover is fixed between the cross portion of a housing and a ball seat.

FIGS. 1 and 4 show an existing ball joint disclosed in Japanese Laid-Open Patent No. Hei 1-172610. A ball seat 102 where a spherical head 101a of a ball stud 101 movably inserted is installed in a housing 103. And then a combining plate 102a provided at the closed portion of the ball seat 102 is heated to be bent outwardly so that the combining plate 102a is hook-combined with the lower portion of the housing 103. That is, one plate of a dust cover 104 is fixed by a rib 105 at a groove formed between a hook protrusion 102b of the ball seat 102 and a step of the housing 103.

In such a ball joint, the combining plate 102a provided at the lower portion of the ball seat 102 is heated and melted to be bent to the outward of the lower portion of the housing 103, thus being hook-combined.

To prevent the ball seat 102 inserted into the housing 103 from rotating while in operation, a V-shaped fixing groove (not shown) is provided at the step of the housing 103 where the combining plate 102a of the ball seat 102 is hook-combined with the housing 103, and melted by heating. Thus, the rotation of the combining plate 102a of the ball seat 102 is prevented.

However, such a ball joint must be additionally provided with the V-shaped fixing groove, and the combining plate 102a must be heated during a manufacturing process adding difficulty and cost to the process. The combining strength between the ball seat 102 and the housing 103 is increased when the thickness of the combining plate 102a formed on the ball seat 102 is thickened. However, when the combining plate 102a is thickened, it is more difficult to melt.

As shown in FIGS. 2 and 4, a ball joint in which a housing 103 where a support formed of a metallic material is welded is provided. After the ball seat 102 formed of a plastic material (including the spherical head 101a of the ball stud 101) is inserted into the housing 103, a covering cap 106 formed of a plastic material is welded to the lower portion of the ball seat 102 by an ultrasonic vibrator. While welding protrusions 106a formed on the covering cap 106 are melted and welded, the ball seat 102 is fixed to the housing 103. Such a ball joint is disclosed in U.S. Pat. No. 5,011,321 to Kidokoro.

However, the method in which that the ball seat 102 is fixed to the housing 103 by welding a covering cap 106 to the ball seat 102 requires additional equipment, and further, requires an apparatus for verifying the welding state. Though the verification apparatus is employed, it is not easy to verify the state of weldment of the covering cap 106 onto the ball seat 102 with accuracy.

FIGS. 3 and 4, disclose and alternative ball joint. An outwardly bent annular hook protrusion 102c is made at the closing portion of a ball seat 102 where a spherical head 101a of a ball stud 101 is inserted. An annular hook protrusion 102c is hooked and fixed at the lower portion of a housing 103, and thus the ball seat 102 is fixed to the housing 103. The diameter of the annular hook protrusion 102c formed at the closing portion of the ball seat 102 is formed to be greater than that of the ball seat 102. Such a ball joint is disclosed in Japanese Utility Laid-Open Patent No. Hei 5-23852.

However, in such a ball joint, the annular hook protrusion 102c may become damaged when a ball seat 102 is inserted in a housing 103, and a combining strength of an annular hook protrusion 102c of the ball seat 102 being hooked and fixed to the housing 103 is weak.

That is, the ball seat 102 is generally inserted by using a tool. Accordingly, when the ball seat 102 does not uniformly receive force from the tool for inserting the ball seat 102 into a housing 103, the ball seat 102 is twisted. Also, when a twisted ball seat 102 is assembled into the housing 103, an annular hook protrusion 102c is easily broken since the diameter of the annular hook protrusion 102c is formed to be greater than that of the ball seat 102. When the ball seat 102 slips out of the housing 103 by a vertical force of a ball stud 101 during operation of the ball joint, the annular hook protrusion 102c cannot withstand the force and is damaged.

FIGS. 5 and 6 illustrate another existing ball joint. The first hook protrusion 112a and the second hook protrusion 112b are formed at the open portion of a ball seat 112 and a dust cover 104 is fixed by a rib at a fixing groove 112c formed between the first hook protrusion 112a and the second hook protrusion 112b. This configuration avoids the likelihood that the dust cover 104 will receive much stress by the operation of a ball joint, such as by shaking and rotating, and makes assembly process automation possible by inserting a ball seat 112 into a housing 113 and fixing it, then fixing a dust cover 104. Such a ball joint is disclosed in U.S. Pat. No. 5,676,485 to Lee.

In order to solve problems such as when a ball seat 112 turns inside a housing during the operation of a ball joint and the ball seat 112 gets twisted and damaged by a tool when the ball seat 112 is inserted into the housing 113, the inside of the housing 113 and the outer body of the ball seat 112 have the same polygonal shape and several incised plates are formed at an annular hook sill 112d formed on the ball seat 112.

In addition, to fix a ball seat 112 in a housing 113 and maintain the fixing strength, a cap 114 is placed on an annular hook sill 112d formed at the lower closing portion of the ball seat 1122. However, the ball joint above has the problem that it can't be easily assembled by an automated process because a ball seat 112 must be inserted into a housing 113 with their polygonal angle being conformed.

SUMMARY OF THE INVENTION

Accordingly, it is an object of the present invention to provide an improved ball joint device for use in a vehicle which eliminates the aforementioned problems encountered with conventional ball joint devices.

Another object of the present invention is to provide a ball joint for use in a vehicle which does not experience the damage caused by twist occurring in the assembly process. To realize the above-mentioned objects, a ball joint of an automobile comprises a spherical head of a ball stud inserted inside of a ball seat under the condition that rotational and tilt operation is enabled. The ball seat above is fixed to a housing and a dust cover is fixed to a fixing groove formed on the outer portion of a ball seat by a rib. A ball joint of automobiles installed on an annular hook sill formed at a cap extending from the other side of the ball seat in the length direction, comprises several projecting parts projected in the radial direction and formed in the direction of length inside of the housing. The housing contains a round section and a concave sill formed at the outside of an annular hook sill.

Still another object of the present invention is to provide a ball joint device for use in a vehicle, which is simple in structure, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
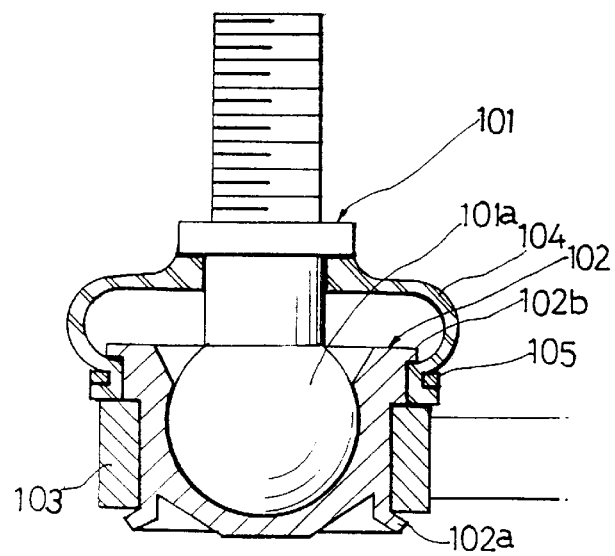
FIG. 1 is a sectional view of a conventional ball joint device as one example.
Figure 2:
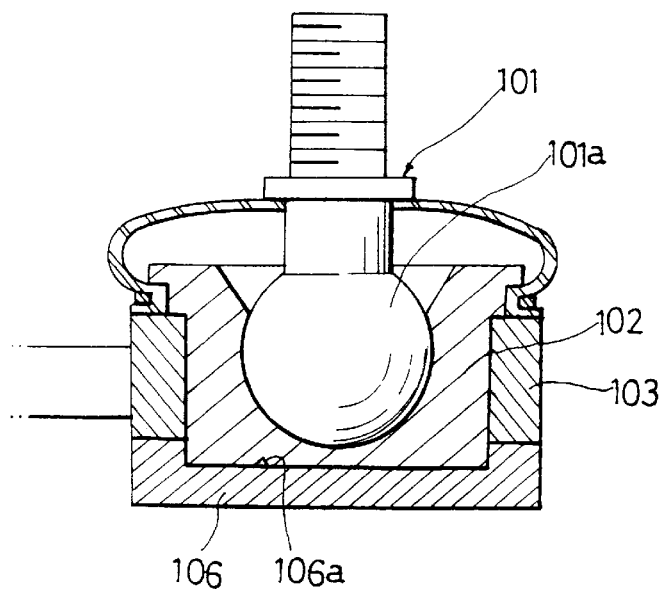
FIG. 2 is a sectional view of a conventional ball joint device as another example.
Figure 3:
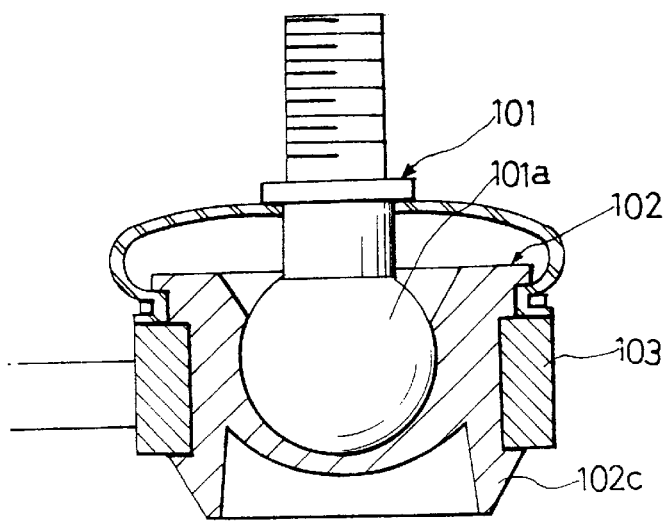
FIG. 3 is a sectional view of a conventional ball joint device as a further example.
Figure 4:
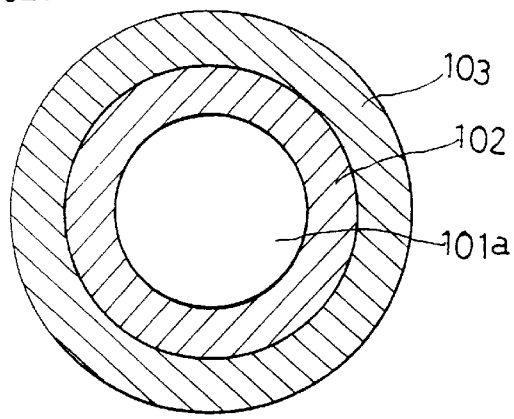
FIG. 4 is a cross-sectional view of FIG. 5.
Figure 5:
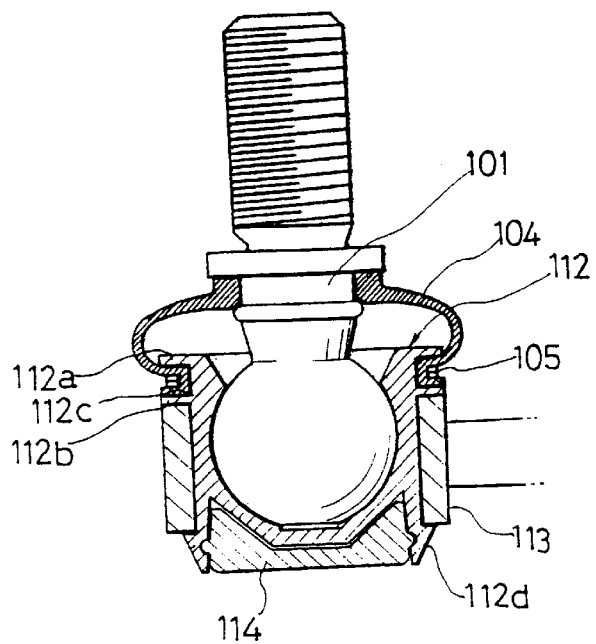
FIG. 5 is a sectional view of a conventional ball joint device as still another example.
Figure 6:
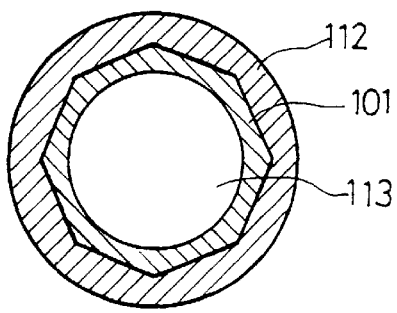
FIG. 6 is a cross-sectional view of FIG. 5.
Figure 7:
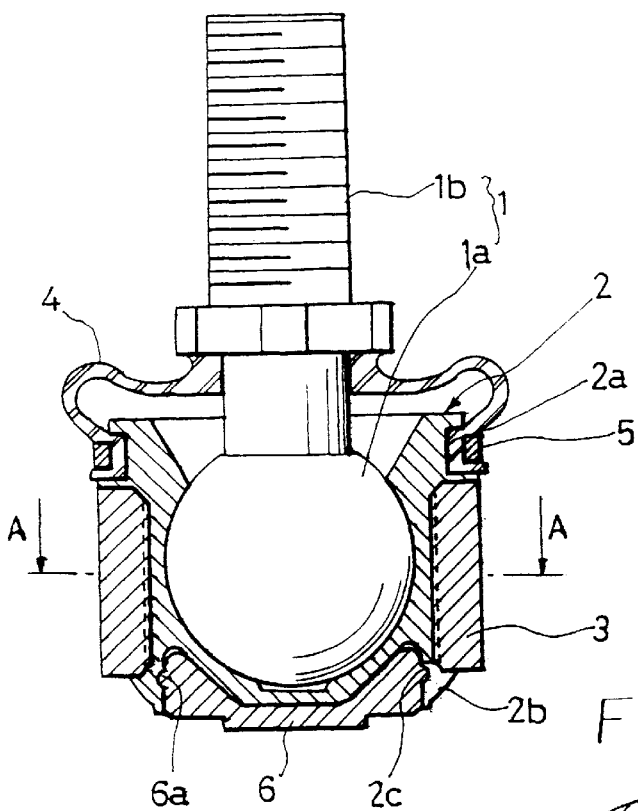
FIG. 7 is a sectional view of a ball joint device for use in a vehicle according to the present invention.
Figure 8:
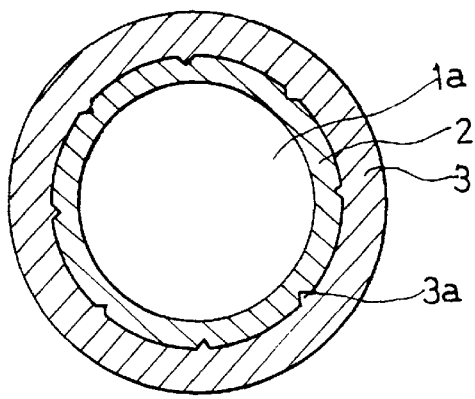
FIG. 8 is a cross-sectional view of FIG. 7, taken along line A—A.
Figure 9:
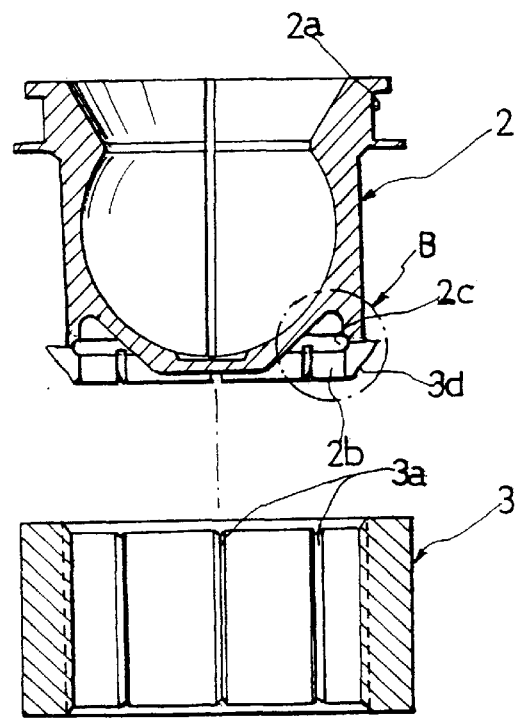
FIG. 9 is an exploded sectional view of a ball seat and a housing of the ball seat device for use in a vehicle according to the present invention.
Figure 10:
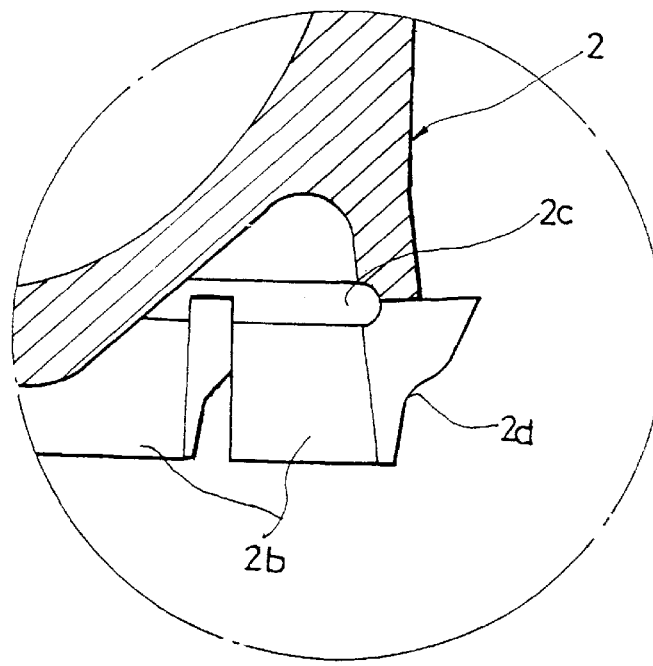
FIG. 10 is an enlarged sectional view of part B of FIG. 10.

Referring now in detail to the drawings for the purpose of illustrating preferred embodiments of the present invention, the ball joint device for use in a vehicle as shown in FIGS. 7 to 10 includes a spherical head 1a of a ball stud 1 inserted inside of a ball seat 2 under the condition that rotational and tilt operation is enabled, the ball seat 2 above is fixed to a housing 3 and a dust cover 4 is fixed to a fixing groove 2a formed on the outer portion of a ball seat 2 by a rib 5. A cap 6 is installed on an annular hook sill 2b which extends from one plate of a ball seat 2.

The ball stud 1 above is composed of a spherical head 1a, and a screw portion 1b, the other portion of the ball stud, is connected to some portion with control of rotation and angle enabled.

The ball seat 2 has the shape of a cylinder open to one side, having an open portion where a spherical head 1a of the ball stud 1 is installed. In drawing, a fixing groove 2a is formed at the outer portion of the upper side in the radial direction. At the lower portion, several projecting annular hook sills 2b extended and divided in the direction of height are formed. A concave sill 2d is formed at the lower portion outside the annular hook sill 2b.

The section of the annular hook sill 2b has a downwardly pointed shape. It is desirable to make the outside diameter of the lowermost portion less than the inside diameter of said housing 3 by 1 mm. Also, a groove 2c for cap installation is formed inside the annular hook sill 2b of the ball seat 2 in the radial direction. Corresponding to this, protrusion 6a is formed around said cap 6. Accordingly, said cap 6 is easily fixed when it is inserted into the annular hook sill 2b.

The housing above 3, having the shape of a cylinder having a round section, has several projecting parts 3a projected in the radial direction and formed in a lengthwise direction. The ball joint formed as this, by making the outside of a ball seat and the inside of a housing a circle, can be inserted without considering direction, which allows for an automated assembly process. When the ball seat 2 is inserted into a housing 3 by force, the projecting part 3a of the housing 3 drives into the outside of the ball seat 2 by force, then gets inserted and assembled. When assembling, putting the ball seat 2 on the upper portion of the housing 3 allows for process automation.

That is, since the outside diameter of an annular hook sill is less than the inside diameter of a housing by 1 mm and a concave sill is formed around the outside of the annular hook sill, the ball seat can be placed on the upper portion of the housing.

A ball stud assembled through this process secures the ball sent to the ball stud even though the ball stud rotates and tilts.

Accordingly, as described above, referring to the ball joint device of an automobile of the present invention, since the outside of the ball seat and the inside of the housing have a round section as well as a protrusion formed inside the housing, it can be inserted without positional adjustment, and the ball seat is easily fixed to the housing, consequently, in case the ball stud moves, the ball seat becomes unmovable. As a result, the advantage follows to lessening the damage of said ball seat. By forming a concave sill between the outside of an annular hook sill as well as making the diameter of the closing portion of the annular hook sill less than the inside diameter of the housing by 1 mm, whenever the ball seat is placed on the housing, said ball seat assumes its proper position on the housing, and which removes twist during insertion, which results in ease of process automation.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A ball joint comprising:
   a cylindrical housing containing a plurality of projections, the projections extending along an axial length of an interior of the cylindrical housing;
   a cylindrical ball seat inserted within said cylindrical housing and secured to said cylindrical housing by said plurality of projections, the ball seat engaging the projections along a recess in a portion of an outer surface of the cylindrical ball seat, the ball seat being an integral member extending through the interior of the cylindrical housing and including an annular hook sill;

a ball stud having a spherical head portion rotatably disposed within said cylindrical ball seat, and a projectiny portion projecting through an open end of said cylindrical ball seat; and a cap having a circumferential protrusion disposed at and secured to an interior circumferential groove of the annular hook sill, at a portion of the cylindrical ball seat distal to the open end of said cylindrical ball seat, wherein an outside diameter of an end portion of the annular hook sill is smaller than an inside diameter of the cylindrical housing, and the annular hook sill includes an outer circumferential concave sill formed in said annular hook sill near an end portion of the annular hook sill.

2. The ball joint of claim 1, wherein a cover is fixed to the ball seat proximate to the open end of the ball seat.

3. The ball joint of claim 2, wherein the cover is secured to the open end of the ball seat by a rib, the rib engaging a fixing groove of the cover.

4. The ball joint of claim 1, wherein the annular hook sill includes a plurality of axially extending slits formed in an end portion of the annular hook sill.

* * * * *